US008903445B2

(12) United States Patent
Dahl et al.

(10) Patent No.: US 8,903,445 B2
(45) Date of Patent: Dec. 2, 2014

(54) POC SERVER AND A MOBILE TERMINAL COMPRISING A POC CLIENT FOR PROVIDING POC COMMUNICATION SERVICES

(75) Inventors: Jan Dahl, Älvsjö (SE); Jan Holm, Gävle (SE)

(73) Assignee: Optis Wireless Technology, LLC, Plano, TX (US)

( * ) Notice: Subject to any disclaimer, the term of this patent is extended or adjusted under 35 U.S.C. 154(b) by 713 days.

(21) Appl. No.: 12/936,439

(22) PCT Filed: Apr. 8, 2008

(86) PCT No.: PCT/SE2008/050401
§ 371 (c)(1),
(2), (4) Date: Oct. 5, 2010

(87) PCT Pub. No.: WO2009/126072
PCT Pub. Date: Oct. 15, 2009

(65) Prior Publication Data
US 2011/0034202 A1 Feb. 10, 2011

(51) Int. Cl.
*H04Q 7/20* (2006.01)
*H04W 4/10* (2009.01)
*H04W 76/00* (2009.01)

(52) U.S. Cl.
CPC .............. *H04W 4/10* (2013.01); *H04W 76/005* (2013.01)
USPC ........... 455/518; 455/519; 455/416; 455/500; 455/517; 455/509; 370/259; 370/261; 370/262; 370/265; 370/329

(58) Field of Classification Search
CPC ..... H04W 76/005; H04W 4/10; H04W 72/10; H04W 88/06; H04W 76/025; H04W 4/08; H04W 8/186; H04L 65/4061; H04L 29/06442; H04L 29/08576; H04L 65/1006; H04L 67/14; H04L 29/06197; H04L 29/06326; H04L 65/1069; H04M 2215/2093
USPC ........... 455/518, 519, 552.1, 512, 403, 412.1, 455/412.2, 420, 464, 509, 510, 514, 455/435.1–435.3; 370/260, 266, 447
See application file for complete search history.

(56) References Cited

U.S. PATENT DOCUMENTS 7,200,396 B2 * 4/2007 Kauppinen ................ 455/435.3
(Continued)

FOREIGN PATENT DOCUMENTS

EP          1696636 A1     8/2006
EP          1868341 A1    12/2007
(Continued)

OTHER PUBLICATIONS

PCT/SE2008/050401, PCT Written Opinion of the International Searching Authority dated Jan. 28, 2009, 5 pages.

*Primary Examiner* — Sujatha Sharma
(74) *Attorney, Agent, or Firm* — Vincent J. Allen; Stephen Y. Liu; Carstens & Cahoon, LLP (57) ABSTRACT

The present invention relates to a Push to talk Over Cellular [PoC] Server for providing PoC communication services in mobile radio communications system, the PoC Server being arranged to perform at least one Controlling PoC Function for a PoC Session between PoC Clients in mobile terminals. The PoC Server is characterized in that it is arranged to: receive a first information indicating the PoC Session priority order for the PoC Session for each of the PoC Clients participating in the PoC Session; receive a second information, if any one of the PoC Clients is also participating in other simultaneous PoC Sessions, indicating the PoC Session priority order for the other simultaneous PoC Sessions for each of the PoC Clients participating in the other simultaneous PoC Sessions; store the first and second information for enabling control of the transmission of Media in the PoC Session based on the first and second information. The present invention also relates to a method, a mobile terminal comprising a PoC Client and a method thereof, a mobile radio communications system and a computer program product.

15 Claims, 8 Drawing Sheets

(56) References Cited

U.S. PATENT DOCUMENTS

| | | |
|---|---|---|
| 7,747,270 B2 | 6/2010 | Schwagmann et al. |
| 7,991,898 B2 | 8/2011 | Huh et al. |
| 8,412,253 B2 * | 4/2013 | Holm et al. .................. 455/518 |
| 2005/0124365 A1 * | 6/2005 | Balasuriya et al. ........... 455/518 |
| 2006/0171528 A1 * | 8/2006 | Kaida ..................... 379/406.08 |
| 2006/0229094 A1 * | 10/2006 | Huh et al. .................... 455/518 |
| 2007/0058573 A1 * | 3/2007 | Schwagmann et al. ....... 370/260 |
| 2009/0093231 A1 * | 4/2009 | Zhao ............................. 455/406 |
| 2009/0124246 A1 * | 5/2009 | Huh et al. .................... 455/418 |
| 2009/0280851 A1 * | 11/2009 | Dostal et al. ................. 455/518 |
| 2010/0017524 A1 * | 1/2010 | Huh .................. 709/228 |

FOREIGN PATENT DOCUMENTS

| | | |
|---|---|---|
| EP | 1898567 | 3/2008 |
| WO | 2006109964 A1 | 10/2006 |

* cited by examiner

PoC SERVER AND A MOBILE TERMINAL COMPRISING A PoC CLIENT FOR PROVIDING PoC COMMUNICATION SERVICES

TECHNICAL FIELD

The present invention relates in general to a PoC Server and terminal for providing Push to talk Over Cellular (PoC) communication services in a communications system, and in particular to a PoC Server and a mobile terminal for providing information to a PoC User participating in a PoC Session of a PoC communication service in a mobile radio communications system.

BACKGROUND

Many existing mobile radio communications systems today use a core network comprising a IP Multimedia Subsystem (IMS), or other Session Initiated Protocol (SIP) based systems containing the functionality of an IMS system, for offering packet switched services to e.g. users of mobile terminals, IP-based communication terminals or the like.

An example of such a packet switched service is the Push to talk Over Cellular (PoC) communication service that provides wireless or wireline PoC Users with a virtually instantaneous method of connecting to other PoC Users by just the push of a button on their mobile terminals. The PoC communication service is half-duplex and can be compared to the communication performed when using conventional walkie-talkies. The PoC communication service can be used for person-to-person calls as well as for group communications over cellular networks, such as GSM, WCDMA or CDMA2000 networks, and/or fixed networks, such as any other IP network or interwork with legacy Push To Talk networks.

The PoC communication service has been developed by the Open Mobile Alliance (OMA) in the OMA PoC WG, which is currently described in PoC 1.0 Release and PoC 2.0 Release.

PoC Users uses PoC Clients, comprised in their mobile terminals, to access the PoC Service. In order to communicate using the PoC Service, the PoC Client establishes a PoC Session. The PoC Session is routed through at least one PoC Server. The at least one PoC Server may perform a Participating PoC Function and/or a Controlling PoC Function. However, both are necessary in order to establish a PoC Session. As a PoC Session has been established through one or several PoC Servers, the PoC Users participating in the PoC Session may start communicating over the half-duplex PoC communication service. It should be noted that the term PoC Session may hereinafter be used to refer to a 1-1 PoC Session, an Ad-hoc PoC Session, Pre-arranged PoC Group Session or a Chat PoC Group Session or the like.

A PoC User can also participate in one or more PoC Sessions at the same time. In order to make it possible for the PoC User to only receive Media from one PoC Session at a time, a function called Simultaneous PoC Sessions has been developed as part of the OMA PoC Specifications. The OMA PoC Specifications defines a priority order, which informs the PoC Server how to prioritize the one or more PoC Sessions if Media is received for more than one PoC Session. The PoC Server may then select from which PoC Session it shall forward Media to the PoC Client in the mobile terminal of the PoC User. The priority order of the PoC Sessions may be selected by the PoC User using the PoC Client.

However, as will be described more in detail in the description of the present invention, this may lead to instances where PoC Users may be unavailable and not able to listen or take part in a PoC Session. This may cause unnecessary signalling and put additional loads on the network, since Media may be transmitted to PoC Users that are not able to listen to the Media anyway.

Furthermore, other PoC Users participating in a PoC Session may also not know if the information sent in the PoC Session has been received by its intended recipients, unless the recipient acknowledges by answering.

SUMMARY

A problem to which the present invention relates is the problem of excessive signalling and poor utilization of network resources in a PoC communication service.

This problem is addressed by a Push to talk Over Cellular (PoC) Server for providing PoC communication services in mobile radio communications system, said PoC Server being arranged to perform at least one Controlling PoC Function for a PoC Session between PoC Clients in mobile terminals. The PoC Server is characterized in that it is arranged to: receive a first information indicating the PoC Session priority order for the PoC Session for each of the PoC Clients participating in the PoC Session; receive a second information, if any one of the PoC Clients is also participating in other simultaneous PoC Sessions, indicating the PoC Session priority order for the other simultaneous PoC Sessions for each of the PoC Clients participating in the other simultaneous PoC Sessions; store the first and second information for enabling control of the transmission of Media in the PoC Session based on the first and second information.

The object of the present invention is further achieved by a method for providing PoC communication services in a communications system performing at least one Controlling PoC Function for PoC Clients participating in a PoC Session. The method is characterized by the steps of: receiving a first information indicating the PoC Session priority order for the PoC Session for each of the PoC Clients participating in the PoC Session; receiving a second information, if any one of the PoC Clients is also participating in other simultaneous PoC Sessions, indicating the PoC Session priority order for the other simultaneous PoC Sessions for each of the PoC Clients participating in the other simultaneous PoC Sessions; storing the first and second information for enabling control of the transmission of Media in the PoC Session based on the first and second information.

The object of the present invention is also achieved by a mobile terminal comprising a PoC Client for providing PoC communication services in mobile radio communications system, the mobile terminal using the PoC Client to participate in at least one PoC Session established through at least one PoC Server. The mobile terminal comprising the PoC Client is characterized in that the PoC Client is arranged to: send update messages comprising updated PoC Session priority order of the first PoC Client to each of the at least one PoC Server (10) comprising at least one Controlling PoC Function controlling the at least one PoC Session (21; 31), respectively, in which the first PoC Client is participating.

The object of the present invention is further achieved by a method for providing PoC communication services to a user of a first PoC Client participating in a first PoC Session of a PoC communication service in a communications system. The method is characterized by the step of: sending update messages comprising updated PoC Session priority order of said first PoC Client to each of said at least one PoC Server comprising at least one Controlling PoC Function controlling said at least one PoC Session, respectively, in which said first PoC Client is participating.

The object of the present invention is also further achieved by a mobile radio communication system comprising a PoC Server according to the above; and/or a mobile terminal according to the above.

The object of the present invention is further achieved by a computer program product for use in at least one PoC Server, said at least one PoC Server being arranged to perform at least one Controlling PoC Function for a PoC Session between PoC Clients, said computer program product comprising computer readable code means, which when run in the at least one PoC Server causes said at least one PoC Server to perform the steps according to the method for providing PoC communication services in a communications system described above.

An advantage of the above described invention is that by having the Simultaneous PoC Session priority settings and lock status accessible to the Controlling PoC Functions, the Controlling PoC Functions may, based in this knowledge, decide to not send Media to a PoC User since that Media will be discarded anyway. This allows for a better utilization of network resources, such as, for example, available bandwidth, and reduces the loads on the network.

A further advantage of the above described invention is that it also allows for network based services, such as, for example, emergency services etc., to use the status knowledge associated with the Controlling PoC Functions, and to take appropriate actions based on this knowledge.

A further advantage of the above described invention is that it also enables PoC Users to be able to know if other PoC Users in an ongoing PoC Session is able to receive information being shared in an ongoing PoC Session.

An advantage of the above described invention is that it provides a possibility for a PoC User to receive a better understanding of the probability of other PoC Users being able to receive Media in an ongoing PoC Session. A PoC User may, for example, be allowed to have access to, and subscribe to, the status knowledge associated with the Controlling PoC Function about other PoC Users in an ongoing PoC Session. The PoC User may from there take appropriate actions. This may further improve the utilization of network resources, such as, for example, available bandwidth, and reduce loads on the network.

A further advantage of the above described invention is that it allows for client based services to use the status knowledge associated with the Controlling PoC Functions to, for example, notify a PoC User of the status of other PoC Users in a PoC Session etc.

A further advantage of the above described invention is that it is enabled to operate within any Converse IP Messaging system (CPM) or other frameworks for a PoC communication service. Here, the present invention may be enabled to operate in group sessions within said system or framework providing a half or full duplex service.

Further advantageous embodiments of the methods, the mobile terminal, the network node and the mobile radio communication system are set forth in the dependent claims, which correspondingly describe further advantageous embodiments of the present invention.

BRIEF DESCRIPTION OF THE DRAWINGS

The present invention will be described in more detail in the following with reference to the appended drawings, in which.

DETAILED DESCRIPTION

Figure 1:
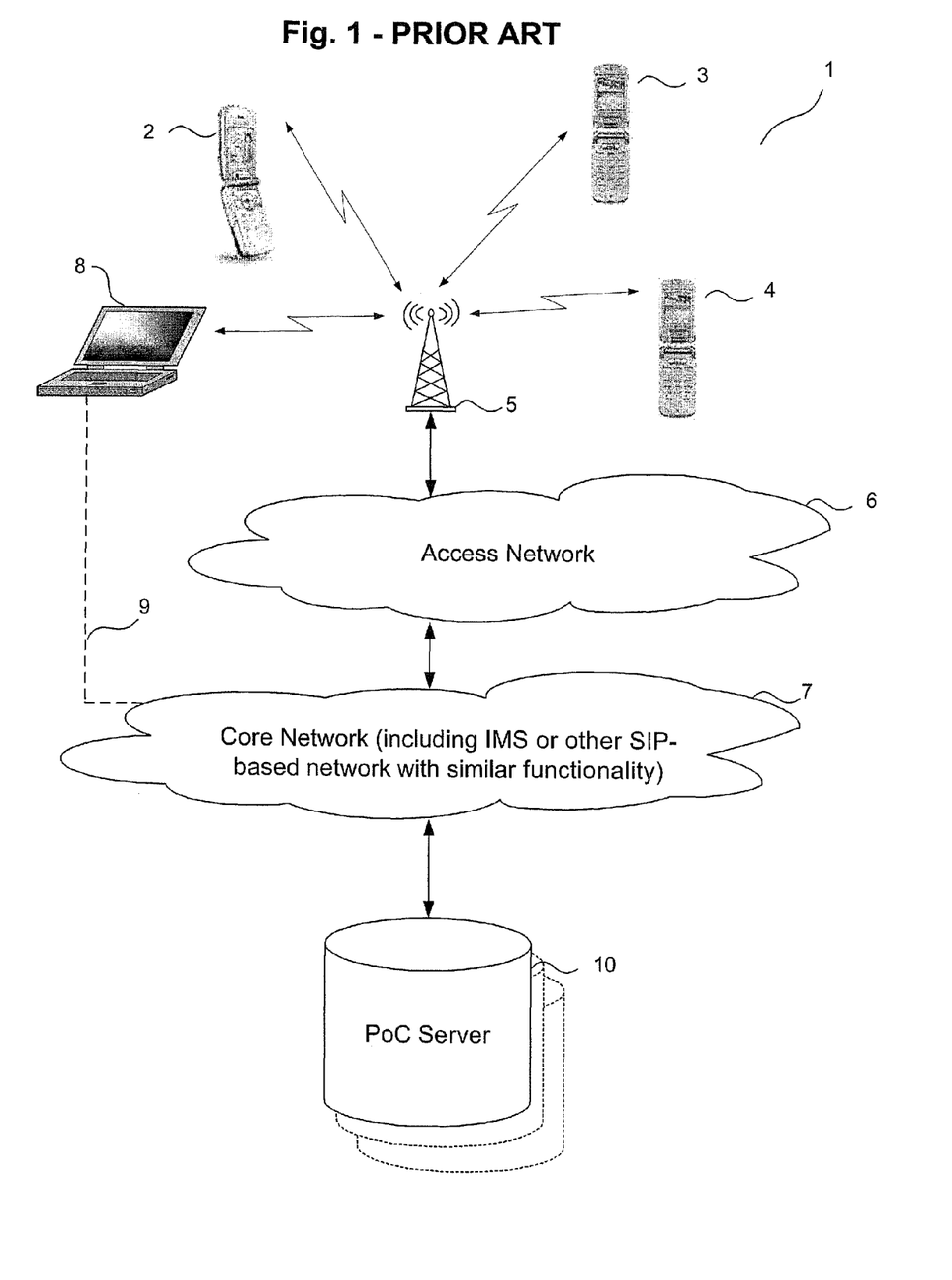
FIG. 1 is a conceptual overview illustrating a mobile radio communication system employing a PoC communication service according to prior art.

FIG. 1 is a conceptual overview illustrating a communications system, e.g. a mobile radio communications system 1, employing a PoC communication service according to prior art. A first mobile terminal 2 comprising a PoC Client A, a second mobile terminal 3 comprising a PoC Client B and a third mobile terminal 4 comprising a PoC Client C are located somewhere within the range or coverage area of a mobile radio communications service, illustrated by a base station 5. The mobile radio communications service is provided by an Access Network 6 and a Core Network 7.

The Access Network 6 of the mobile radio communications system 1 may be, for example, the common radio communications access networks, UTRAN (Universal Terrestrial Radio Access Network) and/or GERAN (GSM/EDGE Radio Access network) or the like. The Core Network 7 includes an IP Multimedia Subsystem (IMS) network or another SIP based systems containing the functionality of an IMS system. The Access Network 6 and the Core Network 7 may form a part of any conventional cellular network, such as, for example, the GSM, WCDMA or CDMA2000 networks or the like. However, it should be noted that the inner structure and details of the Access Network 6 or the Core Network 7 of the mobile radio communications system 1 is not relevant to the object of the present invention.

A computer terminal 8 comprising a PoC Client D is also shown in FIG. 1. The computer terminal 8 may comprise mobile radio communications means for accessing the mobile radio communications service; or may be arranged to connect to the PoC Communications service in the Core Network 7, IMS or other SIP based systems, through fixed access networks 9, such as an IP network or interwork with legacy Push To Talk networks.

An IP Multimedia Subsystem (IMS) network is an open, standardised, multimedia architecture for mobile and fixed IP services. The IMS network provides a wide variety of services, such as, for example, multimedia telecommunication services, chat based services or other user-to-user services as well as user-to-content services. Also, the IMS network may facilitate the offering of popular services such as, for example, voice over IP (VoIP), multiparty gaming, videoconferencing and content sharing etc. In particular, the IMS network may facilitate the offering of the Push to talk Over Cellular (PoC) communication service.

The Push to talk Over Cellular (PoC) communication service may be provided to the IMS network by at least one PoC Server 10. The at least one PoC server 10 may be an application server running on top of the IMS network or another SIP based systems containing the functionality of an IMS system. As described in the background section above, the at least one PoC Server 10 may perform a Participating PoC Function and/or a Controlling PoC Function, both of which are necessary in order to establish a PoC Session.

Figure 2:
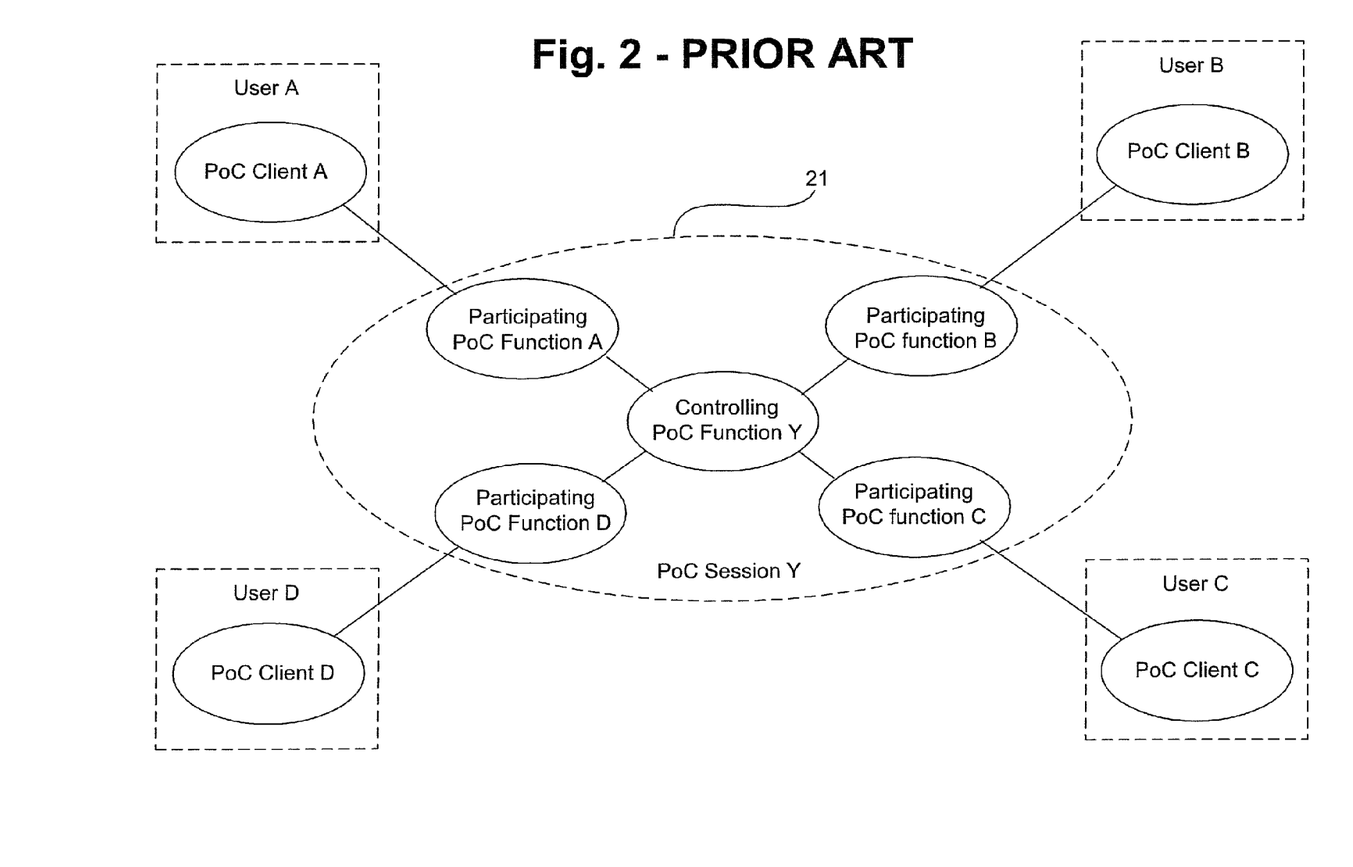
FIG. 2 is a block diagram illustrating the functional structure of a basic PoC Session according to the prior art.

In FIG. 2, a functional structure of a basic PoC Session according to prior art is illustrated.

FIG. 2 shows four different PoC Users: PoC User A, PoC User B, PoC User C and PoC User D. Each PoC User A, B, C and D has a mobile terminal comprising a PoC Client. The mobile terminal of User A comprises a PoC Client A, the mobile terminal of User B comprises a PoC Client B, the mobile terminal of User C comprises a PoC Client C, and the mobile terminal of User D comprises a PoC Client D.

The PoC Users A, B, C and D may use the PoC Clients A, B, C and D, respectively, to access the PoC communication service. In order to communicate using the PoC communication service, a PoC Client may establish a PoC Session Y 21 or join an existing PoC Session Y 21. In FIG. 2, each of the PoC Clients A, B, C and D are currently a participating part in a PoC Session Y 21.

For each of the PoC Clients A, B, C and D participating in the PoC Session Y 21 there is one Participating PoC Function A, B, C and D, respectively. Each of the Participating PoC Functions A, B, C and D may arranged to operate in the PoC Server 7 or in separate or joint PoC Servers. The PoC Session Y 21 is controlled by a Controlling PoC Function Y. The Controlling PoC Function Y may be arranged to operate in the PoC Server 7, in any of said separate or joint PoC Servers comprising any of the Participating PoC Functions A, B, C and/or D, or in a separate PoC Server.

Since the PoC communication service is half-duplex, only one participant, i.e. PoC Client, is allowed to send Media at a time. The arbitration of the permission for the PoC Clients to send Media is controlled by the Controlling PoC Function Y. In order to perform said arbitration the Controlling PoC Function Y may use, for example, the Media Burst Control Protocol (MBCP) developed by the OMA PoC WG as described in "PoC User Plane", version 1.0.1, Open Mobile Alliance™, OMA-TS-PoC_User Plane-V1_0_1.

Any one of the PoC Users A, B, C and D may also participate in one or more additional PoC Sessions at the same time. In order to make it possible for any one of the PoC Users A, B, C and D to only receive Media from one PoC Session at a time, a Simultaneous PoC Session may be used in the Home PoC Network of the PoC User. The Home PoC Network is the PoC Server 7 currently performing the Participating PoC Function for a PoC Client of a PoC User. A Simultaneous PoC Session is illustrated in FIG. 3.

Figure 3:
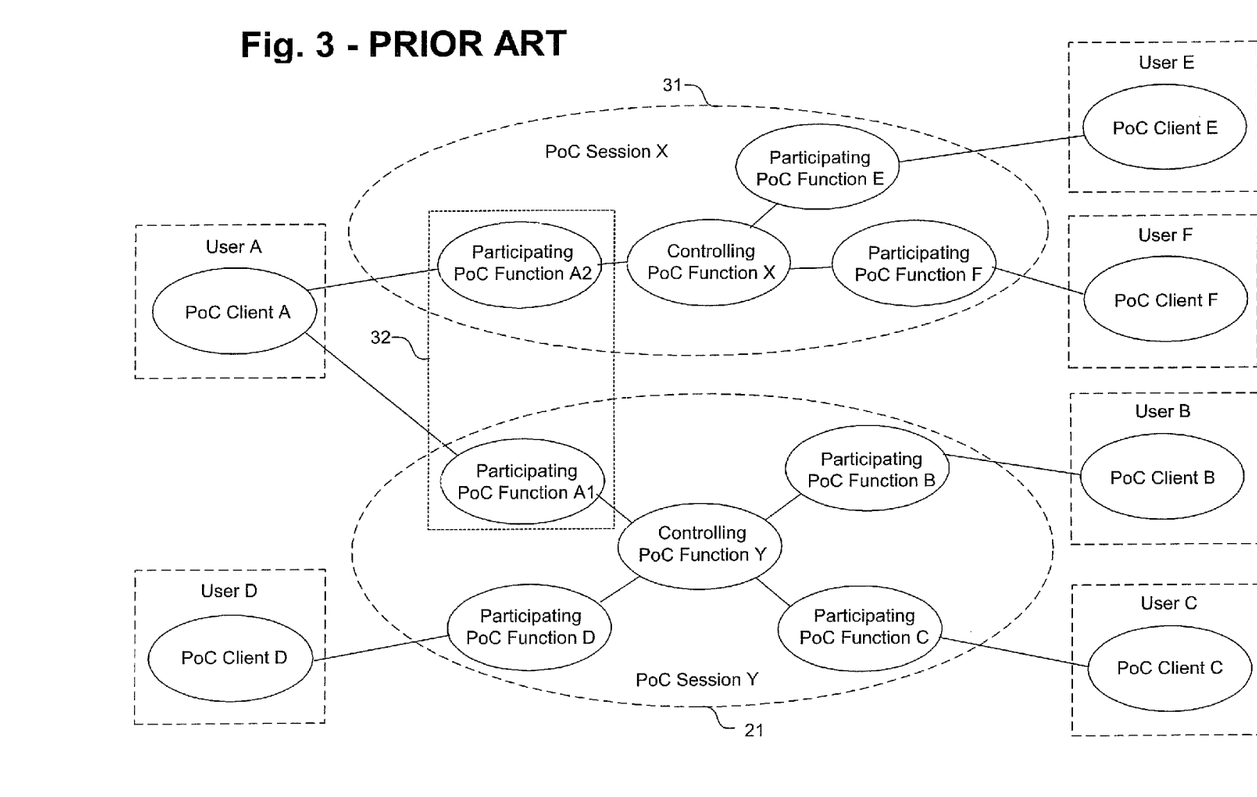
FIG. 3 is a block diagram illustrating the functional structure of Simultaneous PoC Sessions according to the prior art.

FIG. 3 shows the functional structure of a Simultaneous PoC Session as a PoC User A is involved in more than one PoC Session Y 21, 31 at the same time according to prior art.

In FIG. 3, the PoC User A using a mobile terminal comprising the PoC Client A is participating in two different PoC Sessions, the PoC Session Y 21 (as shown in FIG. 2) and the PoC Session X 31. Also participating in the PoC Session X 31 is a PoC Client E in the mobile terminal of a PoC User E and a PoC Client F in the mobile terminal of a PoC User F. For both of the PoC Clients E and F participating in the PoC Session X 31 there is one Participating PoC Function E and F, respectively.

The PoC Session X 31 is controlled by the Controlling PoC Function X. Media sent in the PoC Session Y 21 and the PoC Session X 31 is routed via the same PoC Server 32 to the PoC User A. The PoC Server 32 can be said to comprise the Home PoC Network of the PoC User A. As the PoC Server 32, i.e. the Home PoC Network for the PoC User A, is participating in two different PoC Sessions it performs both the Participating PoC Function A1 for the PoC Session Y 21 and the Participating PoC Function A2 for the PoC Session X 31.

If the PoC Server 32 performing both of the Participating PoC Functions A1 and A2 in the Home PoC Network receives Media from the Controlling PoC Function Y and the Controlling PoC Function X at the same time, the PoC Server 32 will according to a priority order select from which of the PoC Sessions Y 21 or X 31 it shall forward Media to the PoC Client A in the mobile terminal of the PoC User A. The priority order of the PoC Server 32 may be defined by the OMA PoC Specifications.

The PoC User A using the PoC Client A may impact the priority order by selecting one of the PoC Sessions, for example, the PoC Session X 31, as the Primary PoC Session. This automatically set all other PoC Sessions that the PoC Client A may participate in as Secondary PoC Sessions, for example, the PoC Session Y 21. When Media is received from the Primary PoC Session, that is, the PoC Session X 31, the PoC Server 32 performing the Participating PoC Functions A1 and A2 in the Home PoC Network of the PoC User A will prioritize this Media over Media received from a Secondary PoC Session, that is, the PoC Session Y 21.

Media received by the PoC Server 32 from a Secondary PoC Session, i.e. the PoC Session Y 21, will only be forwarded to the PoC Client A in the mobile terminal of the PoC User A when there is no Media in the Primary PoC Session and if a conversation timer in the Primary PoC Session is not running A conversation timer is started in a PoC Session when no Media is received in a PoC Session. This is performed in order to allow other PoC Users a chance to speak before Media in other PoC Sessions is forwarded.

The PoC User A using the PoC Client A may also lock himself to one of the PoC Sessions Y 21 or X 31. If the PoC Client A is locked to a PoC Session Y 21 or X 31, the PoC Server 32 will only forward Media from the locked PoC Session to the PoC Client A, regardless if there is Media received from another PoC Session and regardless whether or not that PoC Session is a Primary PoC Session. No Media from other PoC Sessions will be forwarded by the PoC server 32 to the PoC Client A until the PoC User A either unlocks the locked PoC Session or request permission to send Media in one of the other PoC Sessions.

According to the prior art, the decision to select a PoC Session Y 21 or X 31 to be a Primary PoC Session or a Secondary PoC Session is reserved for the PoC User A using the PoC Client A. The decision can not be influenced by any other PoC User B-F participating in any of the PoC Sessions Y 21 or X 31. It should be noted that a PoC Session Y 21 or X 31 may have an infinite duration, and that a PoC Session Y 21 or X 31 only is released by the PoC Server performing the Controlling PoC Function Y or X, respectively, when none of the PoC Users in the PoC Sessions Y 21 or X 31 are connected, participating in the PoC Sessions Y 21 or X 31.

Furthermore, according to the prior art, it is, for example, not possible for a PoC User B, C or D participating in a PoC Session Y 21 to communicate with the PoC User A, if the PoC User A has selected the PoC Session X 31 as its Primary PoC Session, and the PoC User A is currently participating in an on-going conversation in said PoC Session X 31. It is also, for example, not possible for a PoC User B, C or D participating in a PoC Session Y 21 to communicate with the PoC User A, if the PoC User A is locked to the PoC Session X 31. This, however, is independent of whether or not the PoC User A is currently participating in an on-going conversation.

These properties in a conventional PoC communication service may result in that a PoC User that is simultaneously engaged in more than one PoC Session may miss information that is forwarded in one of the PoC Sessions. This may occur, for example, if a discussion in a PoC Session that is set as the Primary PoC Session by a PoC User is intensive and ongoing for a long period of time, or if a PoC User has forgot to unlock a PoC Session and therefore is not available to listen to other ongoing PoC Sessions.

The situation described above may result in Media being forwarded to a PoC User participating in a PoC Session even though the PoC User is unavailable to listen to the ongoing PoC Session, whereby the Media will be discarded. This leads to excessive signalling and poor utilization of the available bandwidth. Additionally, a PoC User trying to forward information to another PoC User in an ongoing PoC Session have no way of determining whether or not the other PoC User has received the forwarded information, unless the other PoC User transmits Media in the PoC Session acknowledging safe receipt of the information.

These may be crucial problems, e.g. for personnel or supervisors working with emergency services (such as fire fighting, crime fighting, medical treatment etc.), security services (such as surveillance, patrolling etc.) or military services etc. that rely on a fast and efficient communication in order to perform their job satisfactory.

Figure 4:
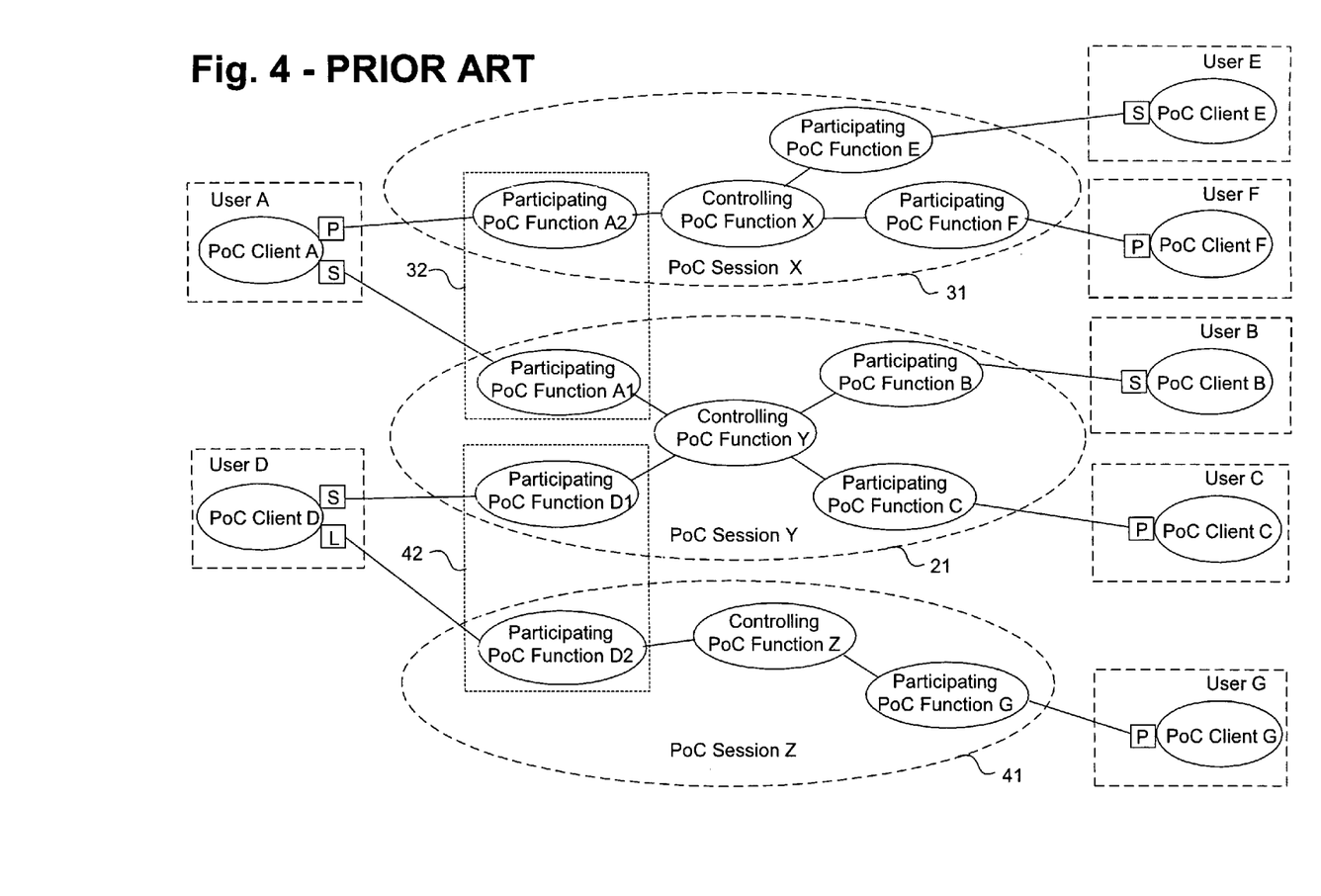
FIG. 4 is a block diagram illustrating PoC Session priority settings and lock status in Simultaneous PoC Sessions according to the prior art.

FIG. 4 illustrates the PoC Session priority order for Simultaneous PoC Sessions according to the prior art. The priority order comprises the priority settings and lock status for the PoC Sessions.

The functional structure of the block diagram in FIG. 4 is similar to the functional structure of the block diagram in FIG. 3, although with the addition of the PoC User D also participating in a PoC Session Z 41 with a PoC User G. The PoC Session Z 41 is controlled by the Controlling PoC Function Z. Media sent in the PoC Session Y 21 and the PoC Session Z 41 is routed via the same PoC Server 42 to the PoC User D. The PoC Server 42 can be said to comprise the Home PoC Network of the PoC User D. As the PoC Server 42, i.e. the Home PoC Network for the PoC User D, is participating in two different PoC Sessions it performs both the Participating PoC Function D1 for the PoC Session Y 21 and the Participating PoC Function D2 for the PoC Session Z 41.

Furthermore, also shown in FIG. 4 is the PoC Session priority settings and lock status for each of the PoC User Clients A-G for each of the PoC Sessions in which they are participating. Primary PoC Sessions are denoted with a "P" and Secondary PoC Sessions are denoted with an "S". A locked PoC Session is denoted with an "L". For example, the PoC User A has selected the PoC Session X 31 as its Primary PoC Session and the PoC Session Y 21 as a Secondary PoC Session; and the PoC User D has not selected any Primary PoC Session, but is locked to the PoC Session Z 41.

However, the priority settings and lock status is only known by the Home PoC Network of the PoC Users, that is, for example, the PoC Server 32 for PoC User A and the PoC Server 42 for the PoC User D. As a PoC User modifies the PoC Session priority settings and/or lock status for PoC Sessions, the PoC Client may update the Participating PoC Function of the PoC Sessions.

Figure 5:
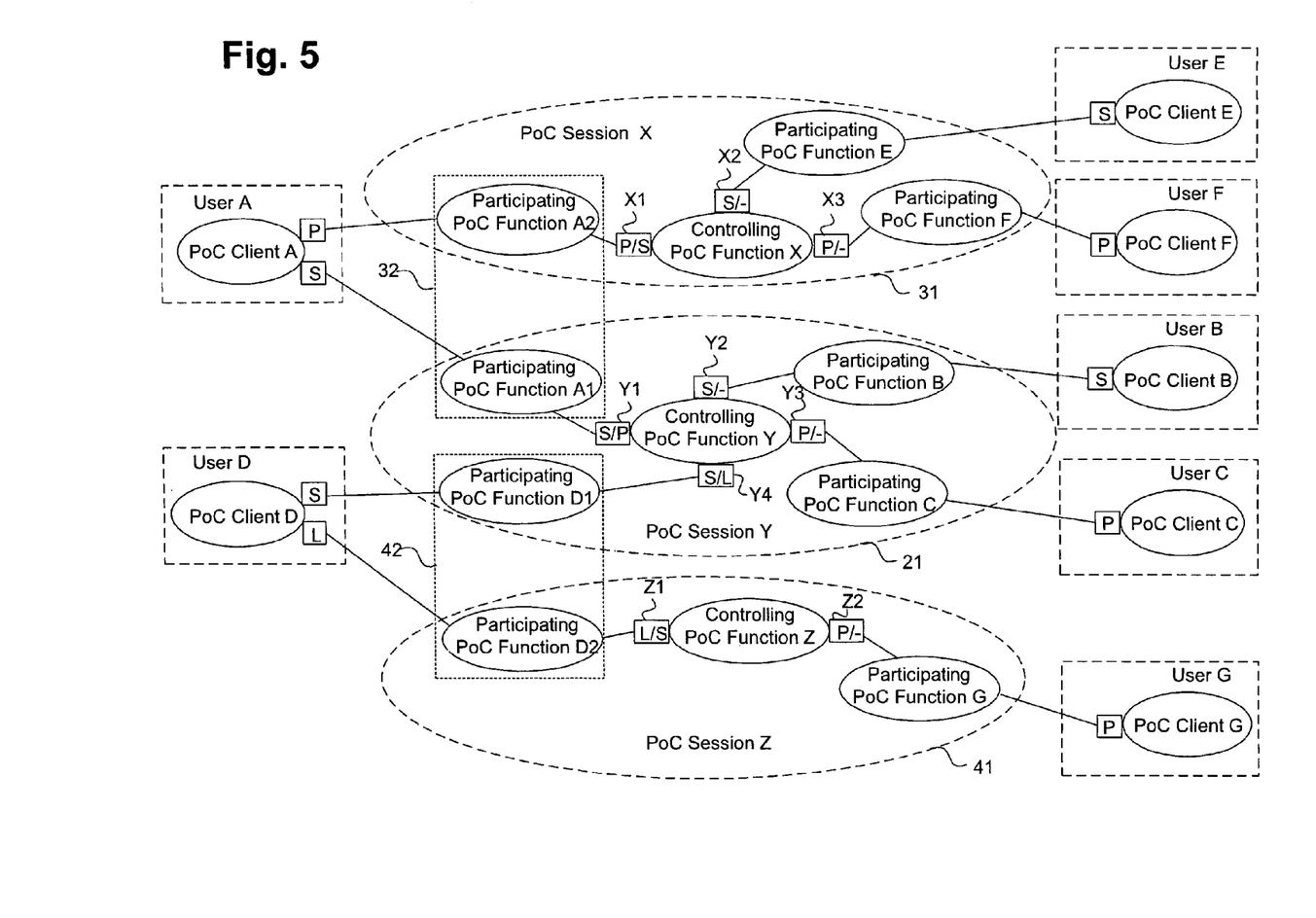
FIG. 5 is a block diagram illustrating PoC Session priority settings and lock status in Simultaneous PoC Sessions according to an exemplary embodiment of the present invention.

FIG. 5 illustrates the PoC Session priority order for Simultaneous PoC Sessions according to an exemplary embodiment of the present invention. The priority order may comprise the priority settings and lock status for the PoC Sessions.

According to the present invention, the PoC Session priority settings and lock status for each of the PoC User Clients A-G for each of the PoC Sessions in which they are participating may be propagated to the Controlling PoC Functions of the PoC Sessions. The information comprising the PoC Session priority settings and lock status may also be extended with the PoC Session priority settings and lock status for all possible Simultaneous PoC Sessions in which the PoC User is participating in. Thus, the Controlling PoC Function of a PoC Session may have access to or comprise information about the PoC Session priority settings and lock status for all Simultaneous PoC Sessions in which all of its participating PoC Users are currently participating in.

In the exemplary embodiment of FIG. 5, the PoC Session priority settings and lock status Y1-Y4, X1-X3, Z1-Z2 first indicates the current status of the PoC Users A-G for the PoC Session Y 21, X 31, Z 41 currently controlled by the Controlling PoC Function Y, X, Z, respectively. Secondly, they indicate the most relevant PoC Session priority settings and lock status of the other PoC Sessions Y 21, X 31, Z 41 in which the PoC Users A-G are participating in.

For example, "S/L" in Y4 denotes that the PoC User D has selected the PoC Session Y 21 as a Secondary PoC Session and is locked to the PoC Session Z 41; "P/S" in X1 denotes that the PoC User A has selected the PoC Session X 31 as the Primary PoC Session and the PoC Session Y 21 as a Secondary PoC Session; "P/–" in X3 denotes that the PoC User F has selected the PoC Session X 31 as the Primary PoC Session and in not currently involved in any other PoC Sessions.

It may also be seen that the PoC User C will not be able to transmit Media to the PoC User D in the PoC Session Y 21, since the PoC User D is locked to another Simultaneous PoC Session, i.e. the PoC Session Z 41. By having the Simultaneous PoC Session priority settings and lock status Y1-Y4 in or accessible to the Controlling PoC Function Y, the Controlling PoC Functions Y may then, based on this knowledge, decide not to send Media from the PoC Session Y to the PoC User D since that Media will be discarded anyway. This allows for a better utilization of network resources, such as, for example, available bandwidth etc., and reduces the loads on the network. Furthermore, it allows for network based services, such as, for example, emergency services etc., to use the knowledge of the Controlling PoC Functions and to take appropriate actions based on this knowledge.

As will be described in to FIGS. 7 and 8, this will also provide possibilities for the PoC Users to receive a better understanding of the probability that another PoC User will be able to receive Media in an ongoing PoC Session. It also allows for client based services to use the knowledge of the Controlling PoC Functions to, for example, notify the PoC User of the status of other PoC Users in a PoC Session etc. This allows for further improved utilization of network resources, such as, for example, available bandwidth etc., and reduced loads on the network.

Figure 6:
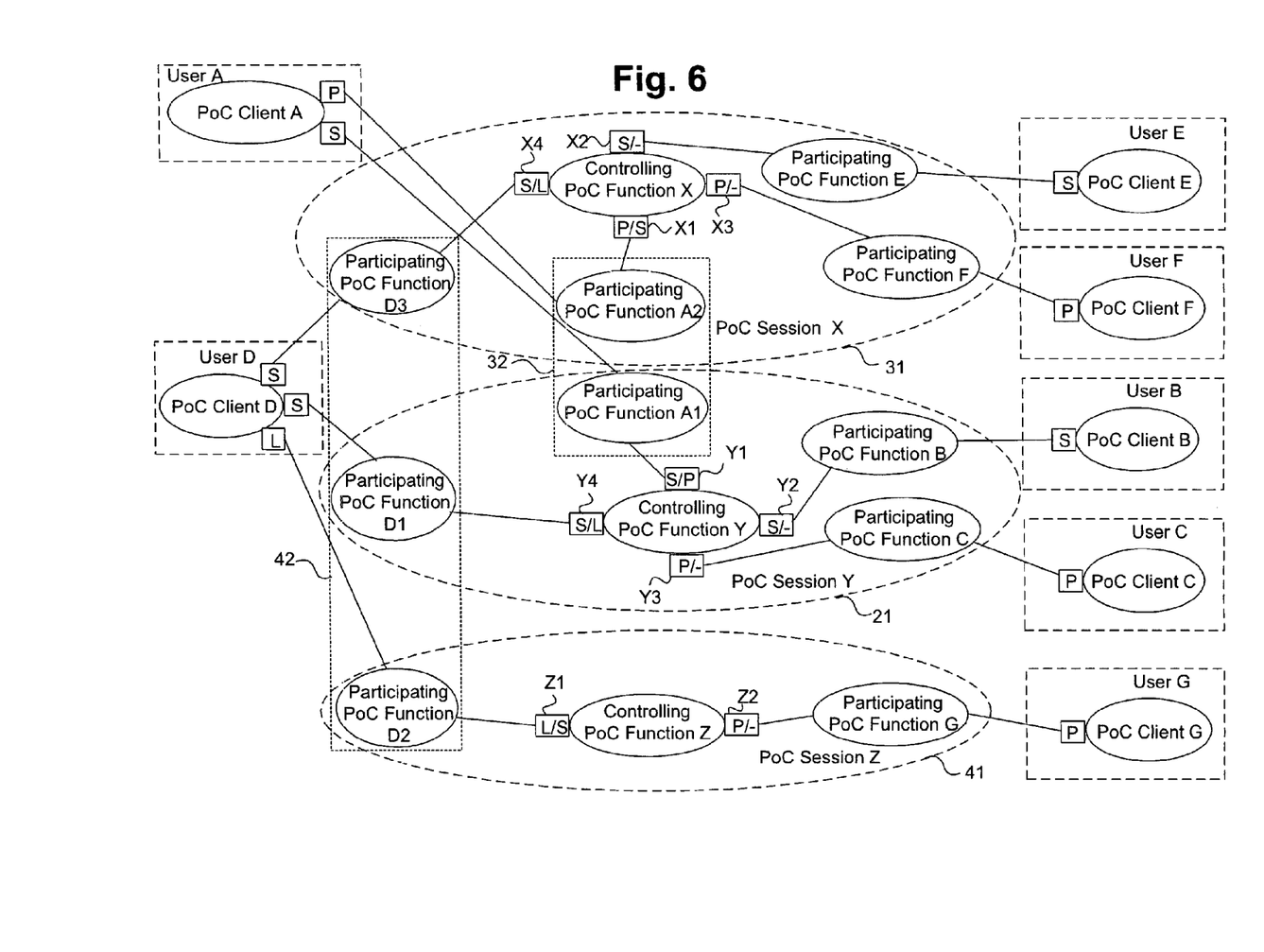
FIG. 6 is a block diagram illustrating PoC Session priority settings and lock status for Simultaneous PoC Sessions according to another exemplary embodiment of the present invention.

FIG. 6 illustrates the PoC Session priority order for Simultaneous PoC Sessions according to another exemplary embodiment of the present invention.

The exemplary embodiment shown in FIG. 6 describes a similar scenario as in the previously described exemplary embodiment shown in FIG. 5, however in this exemplary embodiment the PoC User D is also participating in the PoC Session X 31. The Home PoC Network 42 of the PoC User D therefore includes three Participating PoC Functions D1-D3 one for each PoC Session Y 21, Z 41, X 31, respectively.

Similarly to FIG. 5, the PoC Session priority settings and lock status Y1-Y4, X1-X4, Z1-Z2 in FIG. 6 first indicates the current status of the PoC Users A-G for the PoC Session Y 21, X 31, Z 41 currently controlled by the Controlling PoC Function Y, X, Z, respectively. Secondly, they indicate the most relevant PoC Session priority settings and lock status of the other PoC Sessions Y 21, X 31, Z 41 in which the PoC Users A-G are participating in.

It should be noted that the latter is particularly illustrated in FIG. 6, since the PoC User D here is participating in all three of the PoC Sessions Y 21, X 31 and Z 41. Therefore, "S/L" in Y4 and X4 denotes that the PoC User D has selected the PoC Session Y 21 and the PoC Session X 31 as Secondary PoC Sessions and is currently locked to the PoC Session Z 41. For example, the "L" in Y4 indicating the most relevant of the PoC Session priority settings and lock status of the other PoC Sessions X 31 and Z 41 in which the PoC User D is currently participating in, i.e. the locked status of PoC Session Z 41.

Figure 7:
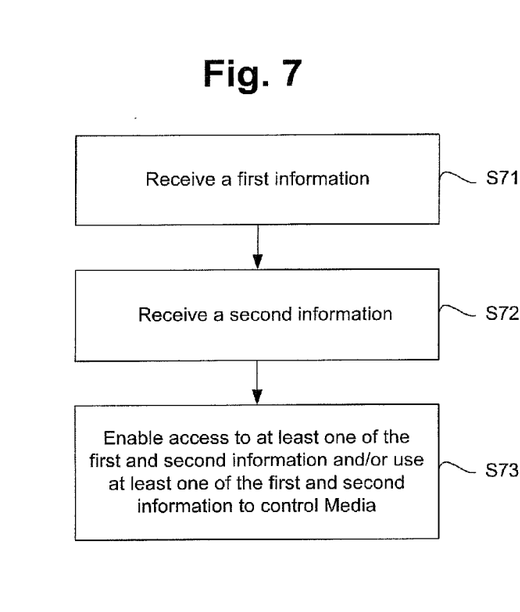
FIG. 7 is a flowchart illustrating an exemplary operation of a PoC Server according to the present invention.

FIG. 7 shows a flow chart that illustrates an exemplary operation of a PoC Server performing a Controlling PoC Function for a PoC Session according to the present invention.

In step S71, the PoC Server performing the Controlling PoC Function Y for the PoC Session Y 21 may receive a first information. The first information may comprise the PoC Session priority order, that is, the PoC Session priority setting and/or lock status, for the PoC Session Y 21 for each of the PoC Clients A-D participating in the PoC Session Y 21. In step S72, the PoC Server performing the Controlling PoC Function Y for the PoC Session Y 21 may receive a second information. The second information may be received if any one of the PoC Clients A-D is participating in any other simultaneous PoC Session, e.g. X 31 and/or Z 41, and may comprise the PoC Session priority order for the other simultaneous PoC Sessions X 31 and/or Z 41 for each of the PoC Clients A-D.

In step S73, the PoC Server performing the Controlling PoC Function Y for the PoC Session Y 21 may use at least one of the received first and second information to control the transmission of Media in the PoC Session Y 21. For example, the PoC Server performing the Controlling PoC Functions Y may then decide not to send Media from the PoC Session Y 21 to/from any of the PoC Clients A-D if it, e.g., knows that the Media will be discarded anyway. Also, the PoC Server performing the Controlling PoC Function Y may also enable access to at least one of said first and second information for each of the PoC Clients A-D participating in the PoC Session Y 21.

Figure 8:
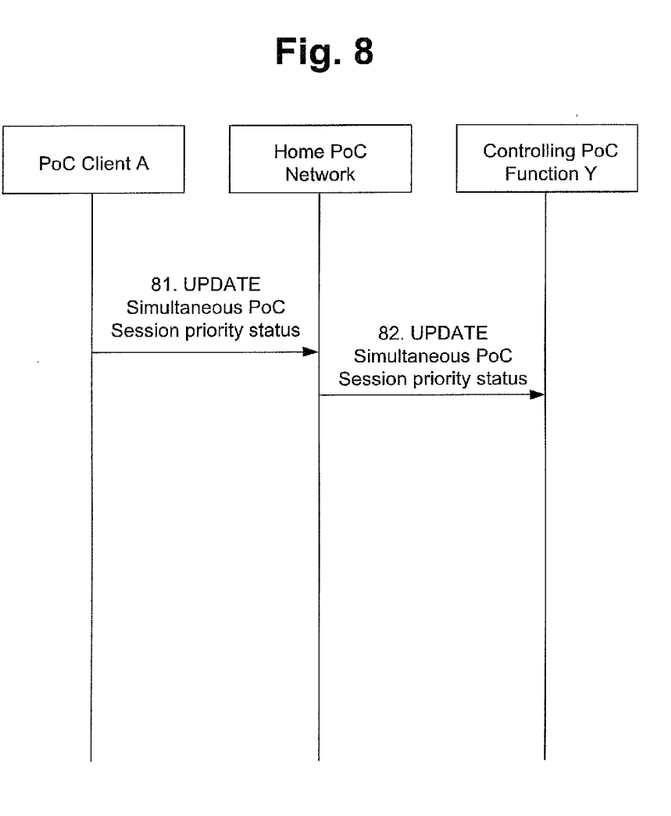
FIG. 8 is a signalling diagram describing an exemplary operation of a PoC Client in a mobile terminal and a PoC Server according to the present invention.

FIG. 8 shows an exemplary operation of a PoC Client in a mobile terminal and at least one PoC Server according to the present invention.

In FIG. 8, as the PoC Client A in FIG. 5 resets or changes its PoC Session priority settings and/or lock status for the Simultaneous PoC Sessions Y 21 and X 31, the PoC Client A may be arranged to send an update message 81 to its Home PoC Network, that is, the PoC Server 32 performing at least the Participating PoC Function A1 and the Participating PoC Function A2. This notification is referred to in FIG. 8 and in the following as a Simultaneous-PoC-Session-priority-status message. The case referred to in the following is the exemplary embodiment of FIG. 5.

The Simultaneous-PoC-Session-priority-status message may include, for example: the identity of the PoC User for whom the notification is reported (i.e. in this case the PoC Client A); the PoC Session priority settings for the PoC Session controlled by the Controlling PoC Function Y (i.e. in this case the PoC Session Y 21); the PoC Session lock status controlled by the Controlling PoC Function Y (i.e. in this case the PoC Session Y 21); the PoC Session priority settings for each other PoC Session in which the PoC User is participating in (i.e. in this case the PoC Session priority settings for the PoC Session X 31 controlled by the Controlling PoC Function X 31); and the PoC Session lock status for each other PoC Session in which the PoC User is participating in (i.e. in this case the PoC Session lock status for the PoC Session X 31 controlled by the Controlling PoC Function X 31).

The Simultaneous-PoC-Session-priority-status message may also include, for example: the most relevant PoC Session priority setting for the other PoC Sessions in which the PoC User is participating (i.e. in this case the priority setting for the PoC Session X 31, which PoC User A has set as Primary); the most relevant PoC Session lock status for the other PoC Sessions in which the PoC User is participating (i.e. in this case the PoC User A is not locked to any other PoC Session); a combined value of the PoC Session priority setting and the PoC Session lock status for all other PoC Session in which the PoC User is participating; or the highest combined value of the PoC Session priority settings and the PoC Session lock status for all other PoC Sessions in which the PoC User is participating. Any combination of the contents described above may also be included in the Simultaneous-PoC-Session-priority-status message.

The Simultaneous-PoC-Session-priority-status message may be implemented, for example, in a new or existing Media Burst Control Message (MBCP) or a SIP message. The SIP message (such as, for example, INVITE, UPDATE or MESSAGE etc.) may carry the Simultaneous-PoC-Session-priority-status information in, for example, the Session Description Protocol (SDP), if allowed in the SIP message; or a new or existing header field; or in the message body; or any combination of the above.

As the Simultaneous-PoC-Session-priority-status message or update message 81 is received by the PoC Server 32 (i.e. the Home PoC Network), the PoC Server 32 may be arranged to forward the Simultaneous-PoC-Session-priority-status message in an update message 82, or route it directly, to the Controlling PoC Function Y. The update message 82 may also be sent to each of the Controlling PoC Functions controlling a PoC Session in which the PoC User is participating (i.e. in this case also to the Controlling PoC Function X).

The PoC Session priority settings and/or lock status may also only be updated when needed. That is, for example, as the PoC User D in FIG. 6 is participating in all three PoC Session Y 21, X 31, Z 41, the Home PoC Network 42 for the PoC User D may be arranged to refrain from updating the PoC Session priority settings and/or lock status of the Controlling PoC Function X for the PoC Session X 31, if the PoC User D switches between being locked to the PoC Session Y 21 instead of the PoC Session Z 41. This may be performed since the PoC Session priority settings and/or lock status for the PoC Session X 31 basically remains unaffected by the change. That is, the most relevant value of the other PoC Session priority settings and lock status is still a locked status.

By constantly having the PoC Session priority settings and/or lock status for all PoC Users A-G updated in the Controlling PoC Functions Y, X, Z of the PoC Sessions Y 21, X 31, Z 41, respectively, as described in the exemplary operation above, allows for new network and/or client based services to be implemented. An example of such a service is described in the exemplary operation below.

Figure 9:
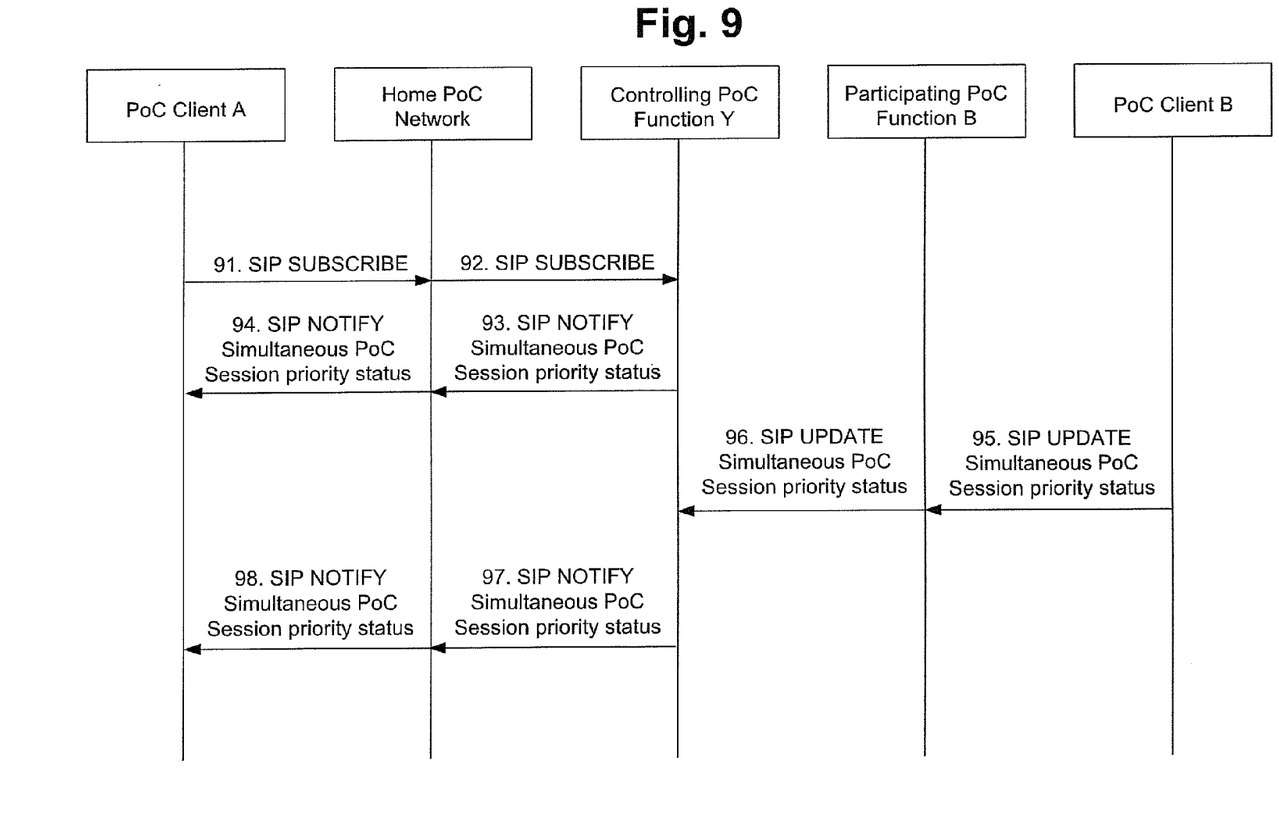
FIG. 9 is a signalling diagram describing another exemplary operation of a PoC Client in a mobile terminal and a PoC Server according to the present invention.

FIG. 9 illustrates another exemplary operation of a PoC Client in a mobile terminal and at least one PoC Server according to the present invention.

As shown in FIG. 9, a PoC User of the mobile terminal comprising the PoC Client A may, according to the present invention, by sending a subscribe message 91 to its Home PoC Network 32 indicate that the PoC User A wishes to subscribe to the PoC Session priority settings and/or lock status for other PoC Users participating in the same PoC Session as the PoC User A, e.g. the PoC Session Y 21 in FIG. 5. The PoC Session priority settings and/or lock status of the PoC Users may be referred to as the Simultaneous-PoC-Session-priority-status.

The Home PoC Network 32 may forward the subscribe message 92 to the Controlling PoC Function Y 21. In response, the Controlling PoC Function Y 21 may send a notification 93 comprising the Simultaneous-PoC-Session-priority-status for other PoC Users participating in the PoC Session Y 21 to the PoC Client A. The notification 93 may be routed through the Home PoC Network 32 and then forwarded 94 to the PoC User A, or may be sent directly to the PoC User A if the Controlling PoC Function Y 21 is located in the Home PoC Network 32.

As described in reference to FIG. 8, a PoC Client B may as it resets or changes its Simultaneous-PoC-Session-priority-status be arranged send an update message 95 to its Home PoC Network, that is, the PoC Server performing the Participating PoC Function B, which may forward 86 the update message to the Controlling PoC Function Y 21.

As the Controlling PoC Function Y 21 updates the Simultaneous-PoC-Session-priority-status for the PoC User B, as described in reference to FIG. 8, it may also send a notification 97 comprising the updated Simultaneous-PoC-Session-priority-status for the other PoC Users participating in the PoC Session Y 21 to the PoC Client A. As described above, the notification 97 may be routed through the Home PoC Network 32 and then forwarded 98 to the PoC User A, or may be sent directly to the PoC User A if the Controlling PoC Function Y 21 is located in the Home PoC Network 32.

The Simultaneous-PoC-Session-priority-status for the PoC Users participating in the PoC Session Y may have to be compiled per PoC User. This compilation, however, may be performed by the Controlling PoC Function Y 21 before sending the notification to the PoC Users, or by the PoC Clients as they receive the notification comprising the Simultaneous-PoC-Session-priority-status for the PoC Users from the Controlling PoC Function Y 21.

The Simultaneous-PoC-Session-priority-status messages, e.g. notifications 93-94 and 97-98, may be implemented, for example, in a new or existing Media Burst Control Message (MBCP) or a SIP message. The SIP message (such as, for example, SUBSCRIBE, NOTIFY, UPDATE etc.) may carry the Simultaneous-PoC-Session-priority-status in, for example, the Session Description Protocol (SDP), if allowed in the SIP message; or a new or existing header field; or in the message body; or any combination of the above.

Also, it should be understood that different protocols may be used by a PoC Client when, e.g. subscribing to the PoC Session priority settings and/or lock status of other PoC Users. For example, signalling using the conference state event package as defined by the OMA PoC Specifications, or any other existing or new event package may also be used for this purpose.

Although access to the information received and stored for each of the PoC Clients participating in a PoC Session by a PoC Server performing the Controlling PoC Function for the PoC Session is described above in the form of a subscription based service to the PoC Clients, there are other ways for the PoC Server to enable or share this information. For example, the PoC Server may be arranged to push or broadcast this information to, e.g. all PoC Clients participating in the PoC Session or a selected group of the PoC Clients participating in the PoC Session.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

We claim:

1. A Push to talk Over Cellular (PoC) Server for providing PoC communication services in a communications system, said PoC Server being arranged to perform at least one Controlling PoC Function for PoC Clients participating in a PoC Session, wherein said PoC Server is arranged to:

receive a first information indicating PoC Session priority order for said PoC Session for each of said PoC Clients participating in said PoC Session;

receive a second information, if anyone of said PoC Clients is also participating in other simultaneous PoC Sessions, indicating said PoC Session priority order for said other simultaneous PoC Sessions for each of said PoC Clients participating in said other simultaneous PoC Sessions;

store said first and second information for enabling control of a transmission of Media in said PoC Session based on said first and second information;

enable access to at least one of said first and second information for each of said PoC Clients participating in said PoC Session;

receive a subscribe message from a subscribing PoC Client participating in said PoC Session; and send a notification comprising said first and second information to said subscribing PoC Client in response to said subscribe message.

2. The PoC Server according to claim 1, further arranged to:

use at least one of said first and second information to control said transmission of said Media in said PoC Session.

3. The PoC Server according to claim 2, further arranged to:

decide whether or not to transmit said Media towards each of said PoC Clients in said PoC Session based on at least one of said first and second information.

4. The PoC Server according to claim 1, further arranged to:

send said notification comprising at least one of said first and second information to said subscribing PoC Client upon receiving update messages from said PoC Clients participating in said PoC Session.

5. The PoC Server according to claim 1, further arranged to:

receive update messages from said PoC Clients participating in said PoC Session comprising updated PoC Session priority order for said PoC Session and/or for said other simultaneous PoC Sessions in which each of said PoC Clients are participating.

6. The PoC Server according to claim 1, wherein signalling is performed using conference state event package.

7. A method for providing Push to talk Over Cellular (PoC) communication services in a communications system performing at least one Controlling PoC Function for PoC Clients participating in a PoC Session, comprising the steps of:

receiving a first information indicating PoC Session priority order for said PoC Session for each of said PoC Clients participating in said PoC Session;

receiving a second information, if any one of said PoC Clients is also participating in other simultaneous PoC Sessions, indicating said PoC Session priority order for said other simultaneous PoC Sessions for each of said PoC Clients participating in said other simultaneous PoC Sessions;

storing said first and second information for enabling control of a transmission of Media in said PoC Session based on said first and second information;

enabling access to at least one of said first and second information for each of said PoC Clients participating in said PoC Session;

receiving a subscribe message from a subscribing PoC Client participating in said PoC Session; and sending a notification comprising said first and second information to said subscribing PoC Client in response to said subscribe message.

8. The method according to claim 7, further comprising the step of:

using at least one of said first and second information to control said transmission of said Media in said PoC Session.

9. The method according to claim 8, further comprising the step of:

deciding whether or not to transmit said Media towards each of said PoC Clients in said PoC Session based on at least one of said first and second information.

10. The method according to claim 7, further comprising the step of:

receiving update messages from said PoC Clients participating in said PoC Session comprising updated PoC Session priority order for said PoC Session and/or for said other simultaneous PoC Sessions in which each of said PoC Clients are participating.

11. A mobile terminal comprising a first Push to talk Over Cellular (PoC) Client for providing PoC communication services in a communications system, said mobile terminal using said first PoC Client to participate in at least one PoC Session established through at least one PoC Server, said mobile terminal being arranged to:

send update messages comprising updated PoC Session priority order of said first PoC Client to each of said at least one PoC Server comprising at least one Controlling PoC Function controlling said at least one PoC Session, respectively, in which said first PoC Client is participating;

send subscribe messages to each of said at least one PoC Server comprising said at least one Controlling PoC Function controlling said at least one PoC Session, respectively, in which said first PoC Client is participating; and receive notifications in response to said subscribe messages comprising updated PoC Session priority order for at least one second PoC Client in said at least one PoC Session from each of said at least one PoC Server comprising said at least one Controlling PoC Function controlling said at least one PoC Session, respectively.

12. The mobile terminal according to claim 11, further arranged to:

send said update messages via a Home PoC Network of said first PoC Client.

13. The mobile terminal according to claim 11, wherein signalling is performed using conference state event package.

14. A method for providing Push to talk Over Cellular (PoC) communication services to a user of a first PoC Client participating in at least one PoC Session established through at least one PoC Server of a PoC communication service in a communications system, comprising the step of:

sending update messages comprising updated PoC Session priority order of said first PoC Client to each of said at least one PoC Server comprising at least one Controlling PoC Function controlling said at least one PoC Session, respectively, in which said first PoC Client is participating;

sending subscribe messages to each of said at least one PoC Server comprising said at least one Controlling PoC Function controlling said at least one PoC Session, respectively, in which said first PoC Client is participating; and receiving notifications in response to said subscribe messages comprising updated PoC Session priority order for at least one second PoC Client in said at least one PoC Session from each of said at least one PoC Server comprising said at least one Controlling PoC Function controlling said at least one PoC Session, respectively.

15. The method according to claim 14, further comprising the step of:

sending said update messages via a Home PoC Network of said first PoC Client.

* * * * *

UNITED STATES PATENT AND TRADEMARK OFFICE
CERTIFICATE OF CORRECTION

| | | |
|---|---|---|
| PATENT NO. | : 8,903,445 B2 | Page 1 of 1 |
| APPLICATION NO. | : 12/936439 | |
| DATED | : December 2, 2014 | |
| INVENTOR(S) | : Dahl et al. | |

It is certified that error appears in the above-identified patent and that said Letters Patent is hereby corrected as shown below:

IN THE SPECIFICATION

In Column 6, Line 38, delete "running A" and insert -- running. A --, therefor.

Signed and Sealed this
Twenty-ninth Day of December, 2015

Michelle K. Lee
*Director of the United States Patent and Trademark Office*